Figure 1:
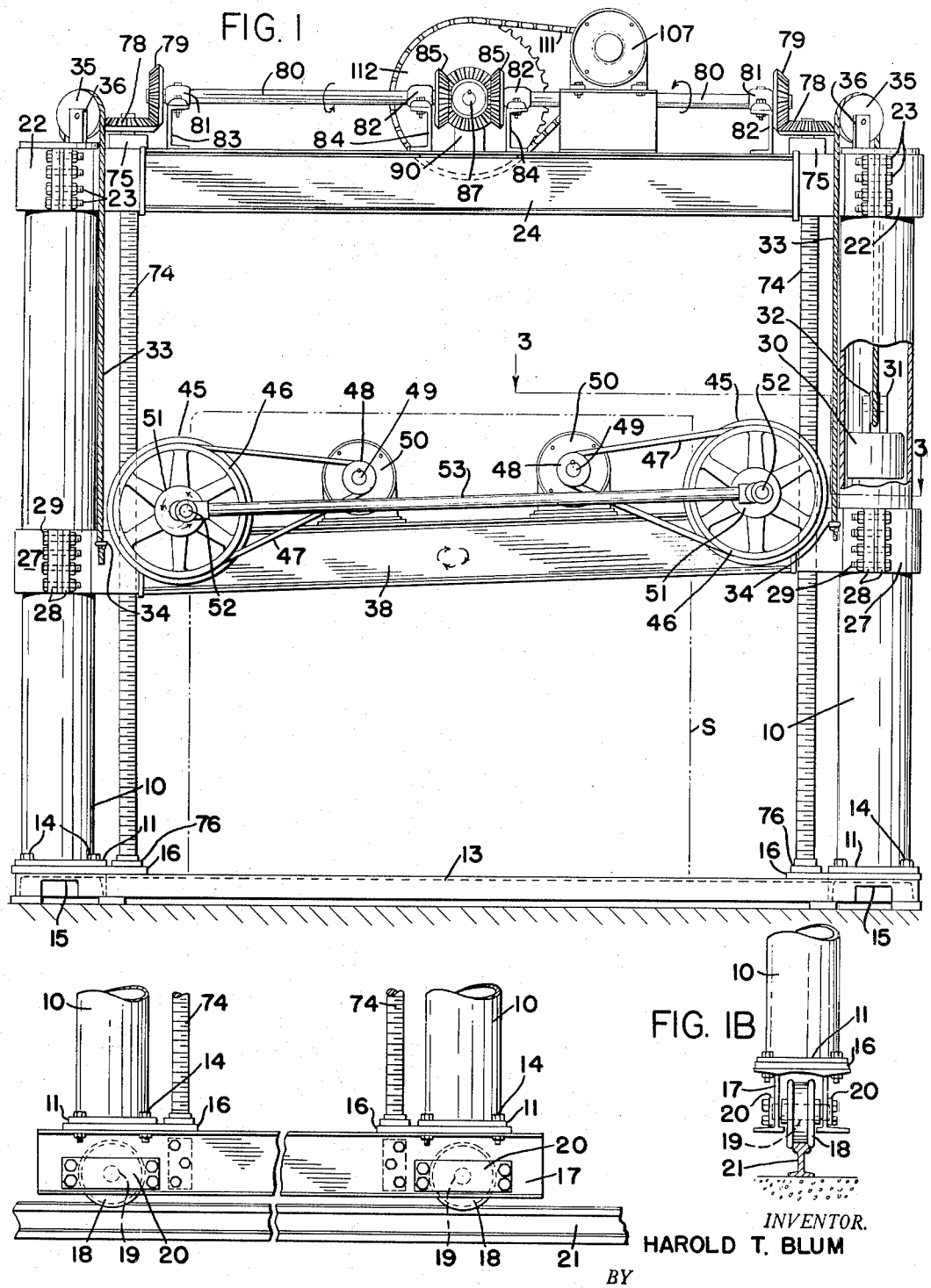

Oct. 11, 1955

H. T. BLUM 2,720,199

GANG SAW MACHINE FOR CUTTING STONE

Filed April 22, 1954

5 Sheets-Sheet 3

INVENTOR.
HAROLD T. BLUM
BY
*Frease & Bishop*
ATTORNEYS

Oct. 11, 1955  H. T. BLUM  2,720,199
GANG SAW MACHINE FOR CUTTING STONE
Filed April 22, 1954  5 Sheets-Sheet 4

INVENTOR.
HAROLD T. BLUM
BY
Frease & Bishop
ATTORNEYS

Oct. 11, 1955 H. T. BLUM 2,720,199
GANG SAW MACHINE FOR CUTTING STONE
Filed April 22, 1954 5 Sheets-Sheet 5

INVENTOR.
HAROLD T. BLUM
BY
Frease & Bishop
ATTORNEYS

United States Patent Office 2,720,199
Patented Oct. 11, 1955

2,720,199

GANG SAW MACHINE FOR CUTTING STONE

Harold T. Blum, Millersburg, Ohio, assignor to The Briar Hill Stone Company, Glenmont, Ohio, a corporation of Ohio Application April 22, 1954, Serial No. 424,912

13 Claims. (Cl. 125—16)

The invention relates to gang saws and more particularly to a gang saw machine for cutting blocks of stone into a plurality of slabs.

In the production of sawed stone, such as limestone, sandstone, marble and granite, for building purposes and the like, the stone is removed from the quarries in huge blocks weighing several tons. These blocks are then taken to the mill where they are cut into slabs of desired thickness.

Under present practice, this operation is accomplished by means of gang saw machines having a swing frame in which is mounted a plurality of saw blades, in the form of plain, smooth edged steel blades.

This swing frame is suspended in the main frame of the machine and arranged to be continuously swung back and forth by means of a pitman, whereby the gang saws move back and forth in an arcuate path. The pitman is driven by a pitman wheel upon a Hurst frame located at some distance from the main frame of the machine.

The block of stone to be cut into slabs is mounted upon a flat car and moved into position below the swing frame which is slowly lowered as the saw blades wear their way into the stone.

An abrasive, such as silica sand or steel shot and water, is continuously delivered beneath the saw blades, causing them to slowly wear into the stone. Owing to the arcuate path in which the saw blades are moved, the stone dust, sludge or cuttings are alternately moved back and forth beneath the saw blades impeding the cutting action thereof.

Such machines therefore cut the stone very slowly, and furthermore they are large and expensive, and take up a considerable amount of floor space in the mill.

It is an object of the present invention to provide a gang saw machine for cutting stone, which will overcome the above-named disadvantages and objections.

Another object is to provide such a machine which is self-contained, comparatively small and will occupy a relatively small amount of floor space.

A further object is to provide a portable machine of this type which may be picked up by a crane or other hoisting means and placed in position over a block of stone to be cut.

A still further object of the invention is to provide such a machine in which the gang saws are moved in a circular path so as to move the stone dust, sludge or cuttings in one direction so as to remove them from the cuts in the stone.

Another object is to provide a gang saw machine of the character referred to in which the saw blades are inclined slightly downward in the direction of the movement thereof in contact with the stone.

A further object is to provide such a machine in which the gang saw frame is moved by means of eccentrics.

A still further object is to provide a machine of this character having screw feed means for moving the gang saw frame vertically relative to the main frame of the machine, a relatively slow drive means being provided for the screw feed means for moving the gang saw frame downwardly during the cutting operation, and a relatively fast drive means being provided for raising the gang saw frame after the cutting operation has been completed.

It is also an object of the invention to provide a machine of this type with novel saw blades having inserts of carbaloy teeth or the like inserted in the cutting edges thereof.

Another object is to provide such carbaloy or the like inserts of dove-tail shape, wedge-fitted into dove-tail grooves in the saw blade.

A further object is to provide the carbaloy or the like inserts of downwardly and outwardly flared shape so as to provide a clearance for the blades.

A still further object of the invention is to provide a portable machine of the character referred to which may be mounted upon rails so as to be moved into position over a stone to be cut.

Figure 2:
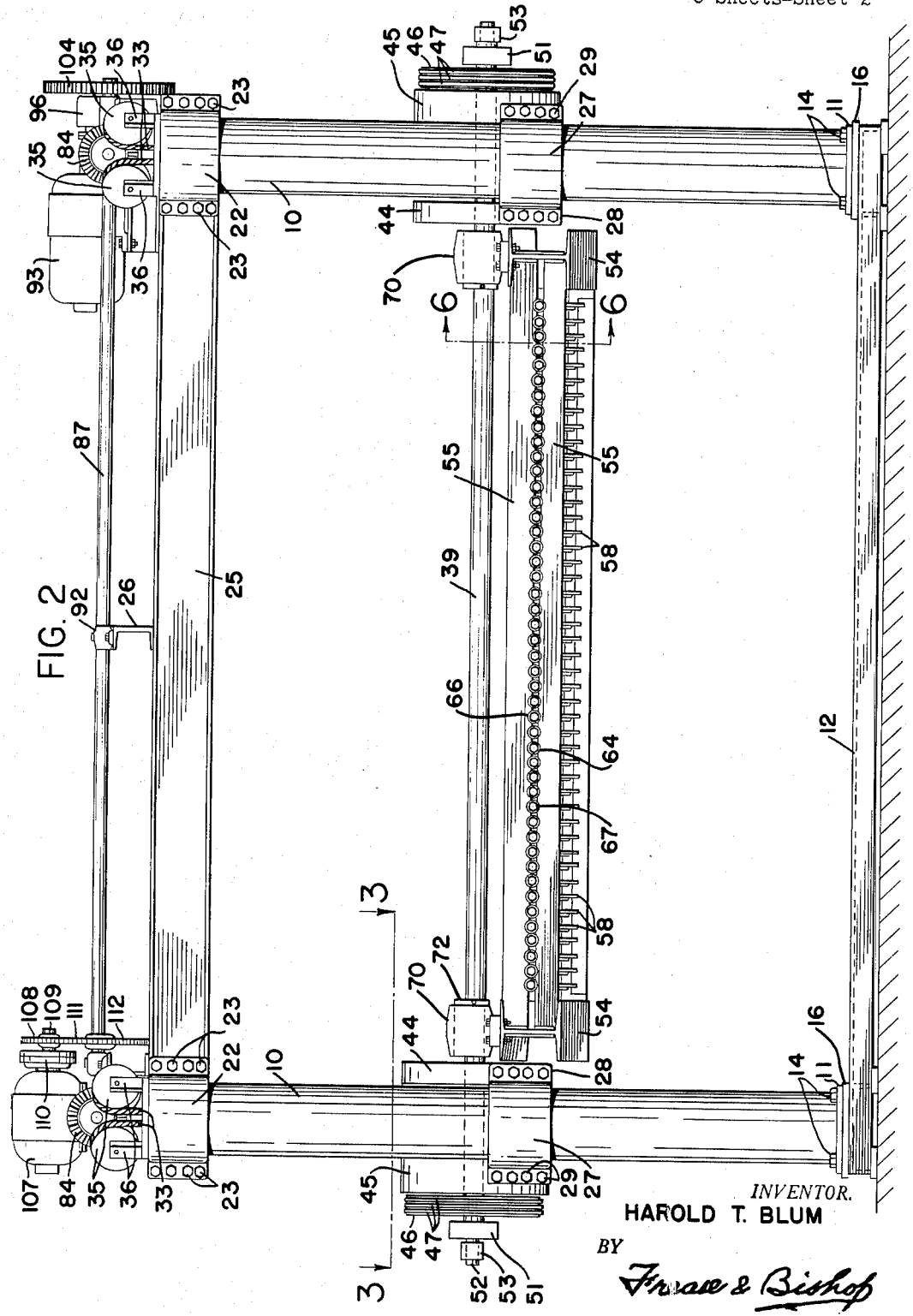
Figure 3:
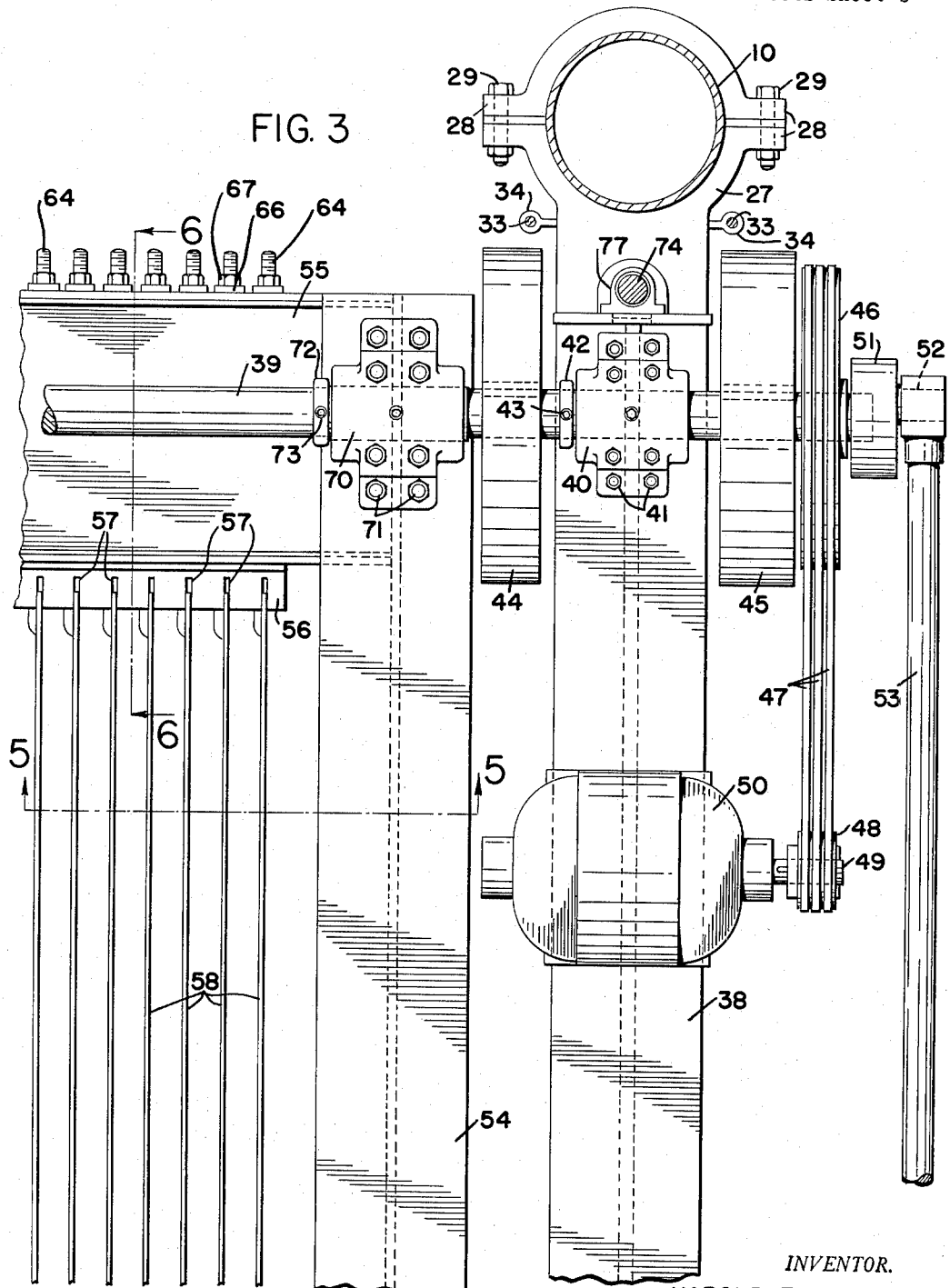
Figure 4:
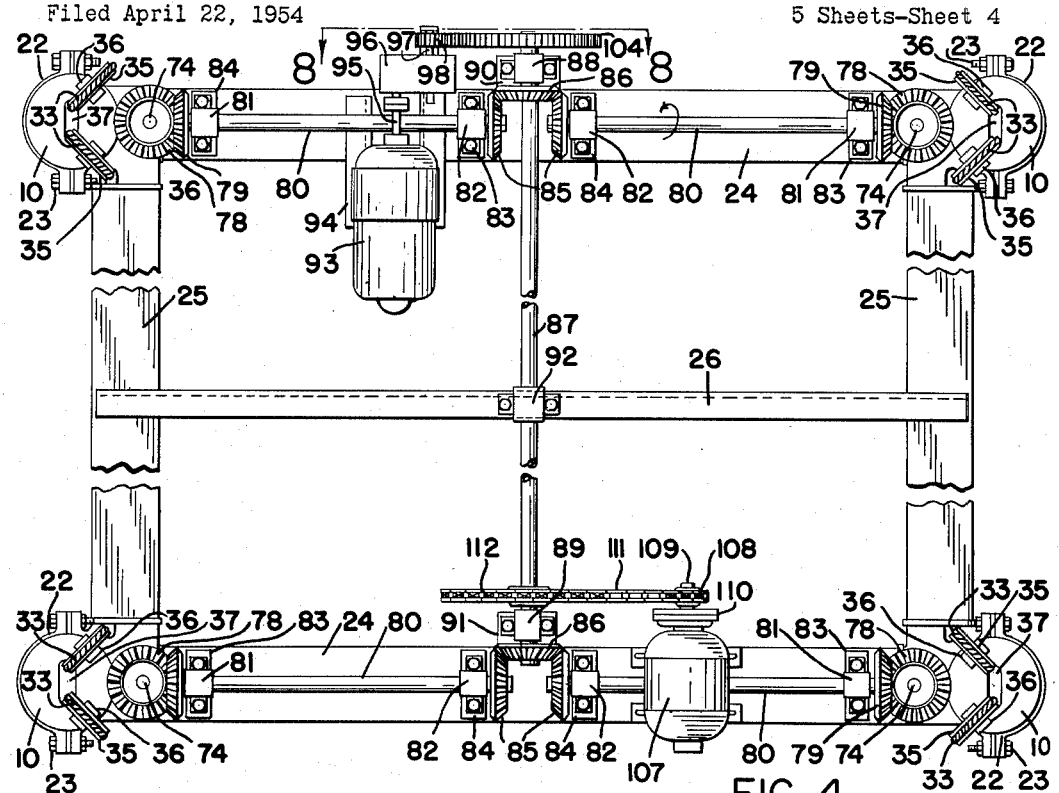
Figure 5:
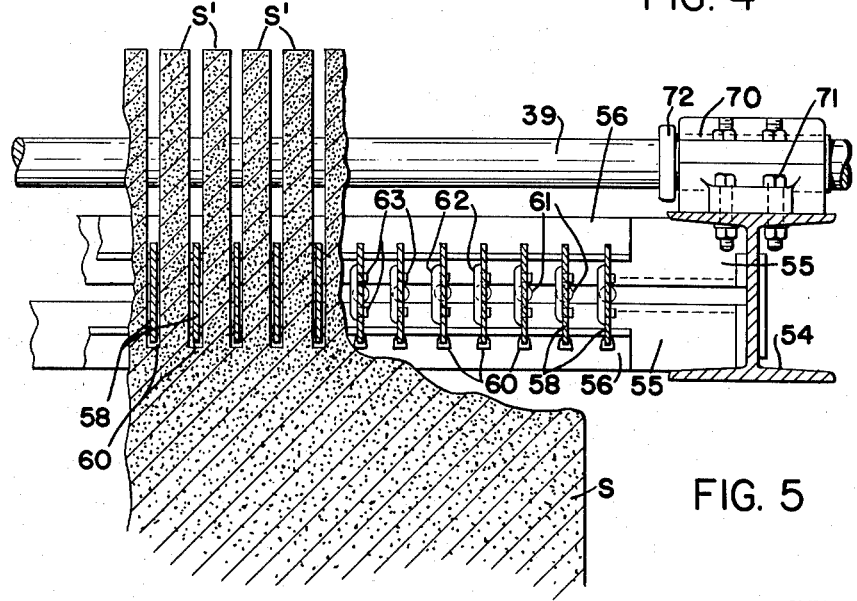
Figure 6:
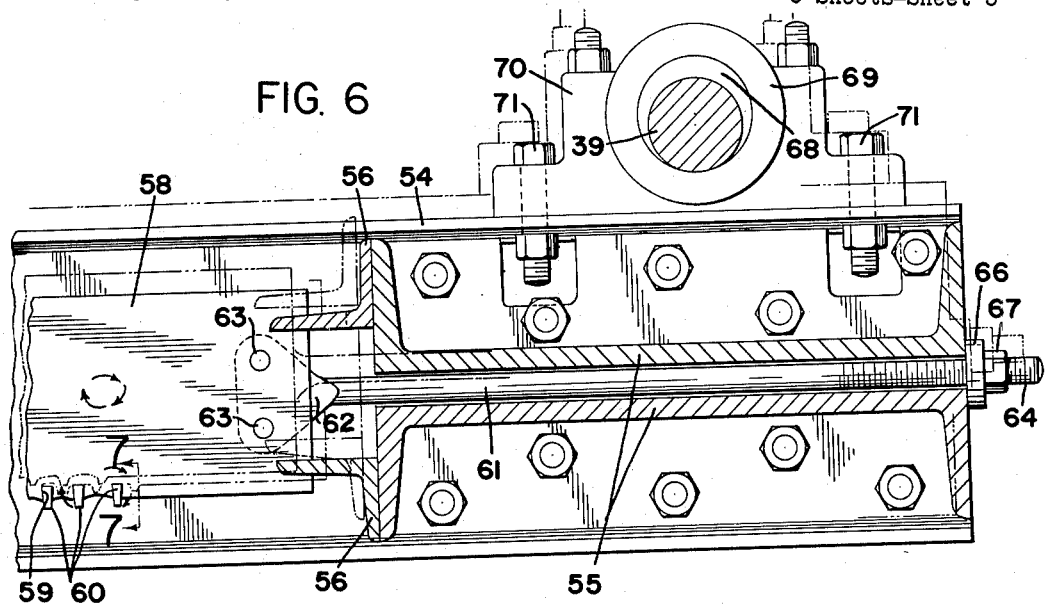
Figure 7:
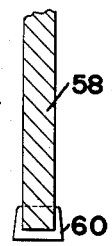
Figure 8:
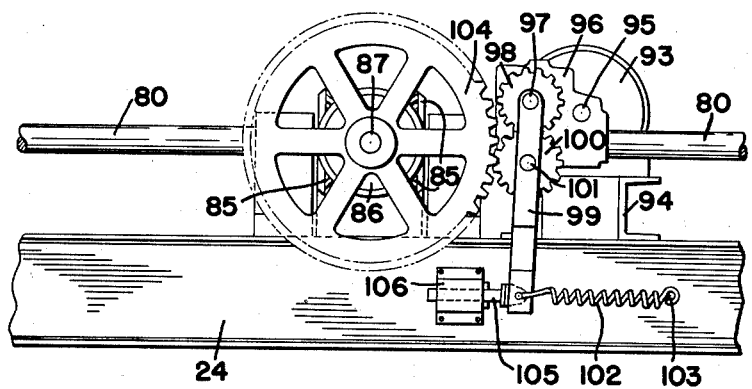

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawings, in which;

Fig. 1 is a side elevation of a gang saw machine constructed in accordance with the invention, parts being broken away for the purpose of illustration;

Fig. 1A a fragmentary side elevation of the lower portion of the machine, showing a modification of the same adapted to be mounted upon rails;

Fig. 1B a similar end elevation;

Fig. 2 a rear end elevation of the machine;

Fig. 3 an enlarged, fragmentary, plan sectional view through one corner of the main frame of the machine, showing a portion of the reciprocating gang saw frame and associated eccentric and driving mechanism therefor, taken as on the line 3—3, Figs. 1 and 2;

Fig. 4 a top plan view of the machine;

Fig. 5 an enlarged, fragmentary, sectional view of a portion of the gang saw assembly, taken on the line 5—5, Fig. 3;

Fig. 6 an enlarged, fragmentary, sectional view of the gang saw frame, taken on the line 6—6, Fig. 2;

Fig. 7 an enlarged, fragmentary, sectional view of one of the saw blades, taken on the line 7—7, Fig. 6; and, Fig. 8 an elevation of the slow feed drive for the screws which lower the gang saw frame.

Referring now more particularly to the embodiment of the invention illustrated, in which similar reference characters refer to similar parts throughout, the improved gang saw machine may be provided with a main frame including four tubular corner posts 10, the lower ends of which may be provided with annular flanges 11 for connection to the longitudinal and transverse bottom rail members 12 and 13 respectively, by bolts or screws 14.

The rail members may be provided with hand grip openings 15 (Fig. 1) to receive hooks of a crane or other hoisting mechanism for raising the apparatus and lowering it in position over a block of stone to be cut. Plates 16 may be interposed between the lower ends of the tubular posts 10 and the bottom rails 12 and 13, for a purpose to be later explained.

If it is desired to mount the apparatus on rails, upon which it may be moved to position over a block of stone, the bottom rails 12 and 13 are dispensed with and the tubular posts 10 are mounted upon a pair of structural members 17 located at each side only of the machine, as shown in Figs. 1A and 1B. These structural members are of generally inverted channel form, as best shown in Fig. 1B, and flanged wheels 18 are journalled therein, near opposite ends thereof.

The axles 19 of the wheels are received in journal boxes 20, mounted on opposite sides of each structural member 17. The wheels 18 ride upon rails 21, whereby the entire apparatus may be moved back and forth upon the rails to position it over a block of stone to be cut and to move it away from the block of stone after the same has been cut into slabs.

Split, flanged collars 22 are fixed to the upper ends of the tubular posts 10, being tightly clamped around the posts, as by the bolts 23, and a top frame is attached to the posts, by means of these collars, and comprises the H-beams 24 and 25 located at opposite sides, and at the front and rear respectively of the apparatus.

Opposite ends of these H-beams may be rigidly attached to the collars 22 in any suitable manner. In order to further brace and strengthen the frame of the apparatus, a transversely disposed structural member, such as the channel member 26, may be welded, bolted or otherwise rigidly attached at each end to intermediate portions of the H-beams 25.

For the purpose of supporting gang saws vertically adjustable as a unit in the machine, sleeves 27 are slidably mounted upon the tubular posts 10. Each of these sleeves may be formed of two parts, provided with opposed flanges 28, bolts 29 connecting the two halves of each sleeve together for slidable movement upon the posts 10.

In order to partially counter-balance the weight of the gang saw assembly carried by the sleeves 27, counter-weights 30 are provided. As best shown in Fig. 1, these counter-weights are preferably located within the tubular posts 10, within which they move up and down without interfering with the operation of the gang saws.

A bracket 31 is fixed upon the top of each counter-weight 30, within which is journalled a grooved sheave or pulley 32. A cable, or other suitable flexible member 33, is connected at opposite ends to each sleeve 27, as by the eyes 34.

This cable extends upwardly from the eyes 34, on each side of the tubular post 10, then over the sheaves or pulleys 35, journalled in brackets 36 upon the top of the post 10, and then down through the central opening 37 in the top of the post, the intermediate portion of the cable being located beneath the sheave or pulley 32.

The counter-weights are thus suspended upon the cables 33, within the tubular posts 10, within which they may move up or down as the sleeves 27 move in the reverse direction upon the exteriors of the posts.

The sleeves 27 upon the front and rear posts 10, at each side of the machine, are connected together by structural members, such as the H-beams 38 (Figs. 1 and 3), which are preferably inclined slightly downwardly and forwardly as shown in Fig. 1.

Transversely disposed shafts 39 extend entirely through the machine near the front and rear ends thereof and are journalled in the bearing blocks 40 attached to the upper sides of the H-frames 38 as by bolts 41 as shown in Fig. 3. Thrust collars 42 may be fixed upon the shafts 39, on the inner sides of the bearing blocks 40, as by set screws 43.

Counter-weighted flywheels 44 and 45 are fixed upon the end portion of each shaft 39 on the inner and outer sides of the corresponding H-beam 38 respectively. Grooved pulleys 46 are fixed upon opposite end portions of each shaft 39, and V-belts 47 operatively connect each of these pulleys to the smaller grooved pulley 48 upon the shafts 49 of the corresponding motors 50 which are mounted upon the upper sides of the H-beams 38 at points properly spaced from the respective grooved pulleys 46.

For the purpose of synchronizing the movement of the two shafts 39, pitman wheels 51 are fixed upon the outer ends of each shaft and provided with wrist pins 52, which are connected together on each side of the machine by the pitman rod 53, whereby the two shafts 39 are rotated in unison.

The gang saws are mounted in a rectangular frame comprising the side members 54 which may be in the form of H-beams, as shown, and the front and back members each comprising a pair of opposed, spaced channel members 55 connected at opposite ends to the end portions of the side members 54.

An angle member 56 is welded, or otherwise rigidly attached, to the inner surface of each of the channel members 55 and provided with a plurality of equally spaced slots 57 receiving the adjacent ends of the saw blades 58.

Each of these saw blades may be formed from a flat strip or band of steel of suitable dimensions, the lower edge of which may be provided with spaced, dove-tail notches 59 to receive the hardened inserts or teeth of carbaloy as indicated at 60 which are upwardly flared in thickness so as to fit within the dove-tail notches 59 in the edge of the blade and are downwardly and outwardly flared in width, as best shown in Fig. 7, so as to provide a clearance for the blade when cutting into the stone.

For the purpose of mounting the saw blades 58 under tension in the reciprocating frame, tie rods 61 are attached to the ends of the blades. This attachment may be made by providing flattened heads 62 upon the inner ends of the tie rods for connection to the end portion of the blade as by rivets 63 or the like.

These tie rods extend between the spaced channel members 55 and the threaded ends 64 of the tie rods extend beyond the channel members to receive washers 66 and nuts 67 for holding the blades in position within the frame.

The gang saw frame is adapted to be reciprocated by means of the shafts 39, and for this purpose eccentrics 68 are fixed upon the shafts 39 and received within the eccentric bearings 69 carried by the pillow blocks 70 attached to the upper surfaces of the H-beams 54 as by bolts 71.

Thrust collars 72 may be fixed upon the shafts 39 at the inner sides of the pillow blocks 70 as by set screws 73. With this arrangement it will be seen that the gang saw frame will be reciprocated in a circular path as indicated by the arrows in Figs. 1 and 6.

For the purpose of moving the gang saw frame vertically within the main frame of the machine, feed screws 74 are provided. These feed screws are journalled in suitable bearings 75 at the top and bearings 76 at the bottom of the main frame and are threaded through the nuts 77 carried by the collars 27 to which the H-beams 38 are connected. Thus by rotation of the feed screws 74 the entire gang saw assembly may be moved downward or upward relative to the main frame.

In order to operate the feed screws 74 in unison, suitable drive means is provided for connection to all of the feed screws. For this purpose, bevel pinions 78 may be fixed to the upper ends of the feed screws 74. These bevel pinions mesh with bevel pinions 79 upon the outer ends of the aligned shafts 80, which are journalled in bearings 81 and 82 mounted upon brackets 83 and 84 respectively, attached to the upper surfaces of the H-beams 24.

The inner ends of each pair of aligned shafts 80 are spaced apart and a bevel pinion 85 is fixed to the inner end of each of these shafts. The pinions 85 mesh with pinions 86 fixed to opposite ends of the drive shaft 87. This drive shaft is located transversely across the top of the main frame, being journalled at opposite ends in the bearings 88 and 89, carried by brackets 90 and 91 mounted upon the corresponding H-frames 24, and in the central bearing 92 mounted upon the channel member 26.

For the purpose of slowly rotating the feed screws 74, in order to slowly move the gang saw assembly downward during the cutting operation, a slow feed drive mechanism shown in detail in Fig. 8 is provided. This slow feed drive mechanism is adapted to be driven by a variable speed motor 93 mounted upon a bracket 94 carried by one of the H-beams 24.

The shaft 95 of the motor is connected to the gear reduction 96. The output shaft 97 of the gear reduction has a pinion 98 fixed thereto and a lever 99 fulcrumed thereon. A pinion 100 is journalled upon the lever 99, as indicated at 101, and this pinion is at all times in mesh with the pinion 98 upon the output shaft of the gear reduction.

A spring 102 is connected to the end of the lever 99 and to a stationary point upon the corresponding H-beam 24, as indicated at 103, and normally holds the pinion 100 out of mesh with the gear 104 which is fixed upon the adjacent end of the drive shaft 87.

The armature 105 of the solenoid 106 is connected to the end of the lever 99, whereby when the solenoid is energized the lever 99 will be pulled to the position shown in Fig. 8, bringing the pinion 100 into mesh with the gear 104, driving the drive shaft 87, and through the pinions 86 and 85 driving the shaft 80 which, through the pinions 79 and 78, will rotate all four of the feed screws 74 in the proper direction, and at the proper speed, to slowly move the entire gang saw assembly downward at slow speed.

For the purpose of rapidly raising the gang saw assembly after a cutting operation has been completed, a fast drive for the feed screws is provided. This fast drive is adapted to be driven by the motor 107, mounted upon the top of the H-beam 24 at the opposite side of the machine. A sprocket 108 is mounted upon the shaft 109 of this motor, and a clutch 110 may be interposed therebetween.

A roller chain 111 connects the sprocket 108 with the sprocket 112 upon the shaft 87. When the motor 107 is operated through the roller chain drive the drive shaft 107 will be driven, and through the pinions 86 and 85 the shafts 80 will be driven. Through the pinions 79 and 78 the feed screws 74 will be rapidly rotated, in a direction and at a speed, to quickly move the gang saw assembly upward after a cutting operation.

In the operation of the machine to cut a block of stone into slabs of desired thickness, saw blades 58 are mounted in the frame at suitable points to cut slabs of the thickness desired.

A block of stone to be cut into slabs is placed at the position where the operation is to be performed, and the entire machine is picked up by a crane or the like and lowered onto the ground or floor, over the block of stone as shown in Fig. 1, in which the block of stone is indicated in broken lines at S.

It should be understood that at this time the frame carrying the gang saws is located near the top of the main frame of the machine, or above the top of the block of stone, rather than in the position shown in Fig. 1 in which the frame is located at a point below the top of the block of stone which it will assume during the cutting operations.

The motors 50 are then started, and through the belts 47, pulleys 46, shafts 39 and eccentrics 68, the gang saw frame will be reciprocated in a circular path as indicated by the arrows in Figs. 1 and 6.

At the same time the solenoid 106 is energized and the variable speed motor 93 is started so that through the reduction gear 96, pinions 98 and 100 and gear 104, the drive shaft 87 will be rotated, and through the pinions 85 and 86, shafts 80 and pinions 79 and 78 the feed screws 74 will be rotated at a speed and in a direction to slowly move the entire gang saw assembly downward so that the reciprocating saw blades 58 will cut vertical grooves in the block of stone S, separating the same into a plurality of slabs S' of desired thickness as shown in Fig. 5.

As the gang saw blades 58 move in the circular path as shown in Figs. 1 and 6, it will be seen that the teeth 60 of the saw blades only contact the stone on the downward and forward movement of the blades, which are raised out of contact with the stone on the upward and rearward movement.

Thus all of the stone dust and cuttings will be continuously washed forwardly and downwardly with a large volume of clear water forced in the inclined grooves cut into the stone, so that this stone dust and cuttings will not accumulate under the saw blades to impede the cutting action thereof.

With this construction the saw blades are forced into the stone and the hard inserted teeth in the saw blades cut the stone in considerably less time than is required by the conventional machines in which the swing frame carrying the gang saws is swung back and forth using a rubbing action and depending on grit carried in the water to do the cutting. The principle of this machine is to cut the stone rather than to wear the stone away as in conventional sawing.

The downwardly and outwardly flared teeth or inserts 60, of carbaloy or the like, in the lower edges of the saw blades, will cut into the stone more rapidly than the smooth edged conventional saw blades, and these inserts being wider than the blades provide a clearance therefor, as best shown in Fig. 6.

After the saw blades have cut entirely through the block of stone, severing it into a plurality of slabs of desired thickness, the solenoid 106 is de-energized and the motor 107 is operated so that through the roller chain 111 and sprocket 112 the drive shaft 87 is operated in the opposite direction and at a rapid speed so that through the pinions and shafts above described the feed screws 74 are operated rapidly in reverse direction in order to quickly raise the entire gang saw assembly in the main frame to a point above the top of the stone.

The entire machine is then raised and moved away from the cut slabs of stone which may be removed and another block of stone placed in position for cutting.

In the modification shown in Figs. 1A and 1B, where the entire machine is mounted upon rails, the machine may be moved back and forth upon these rails to a position over the block of stone to be cut, or away from the same after the cutting operation has been completed.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A gang saw apparatus for cutting stone, comprising a main frame having tubular corner posts and horizontal frame members connected to the upper ends of the posts, a gang saw assembly comprising sleeves slidable upon the corner posts, side frame members connected to said sleeves, a gang saw frame mounted for reciprocation upon said side frame members, a plurality of saw blades mounted in the gang saw frame, sheaves mounted upon the tops of said posts, cables connected to said sleeves, counterweights upon said cables located within the tubular posts, means for reciprocating the gang saw frame in a circular path, and means for moving the gang saw assembly downward upon the main frame.

2. A gang saw apparatus for cutting stone, comprising a main frame having corner posts and horizontal frame members connected to the upper ends of said posts, a gang saw assembly comprising sleeves slidable upon said posts, sheaves mounted upon the top of the frame, cables connected to each sleeve and located over the sheaves, counter-weights upon the cables, side frame members connected to said sleeves, transverse shafts journalled upon said side frame members, eccentrics mounted upon said shafts, a gang saw frame, eccentric bearings upon the gang saw frame cooperating with said eccentrics, a plurality of saw blades mounted in the gang saw frame, means for rotating said shafts to reciprocate the gang saw frame in a circular path, and means for moving the gang saw assembly downward upon the main frame.

3. A gang saw apparatus for cutting stone, comprising a main frame having corner posts and horizontal frame members connected to the upper ends of said posts, a gang saw assembly comprising sleeves slidable upon said posts, side frame members connected to said sleeves, transverse shafts journalled upon said side frame members, eccentrics mounted upon said shafts, a downwardly and forwardly inclined gang saw frame, eccentric bearings upon the gang saw frame cooperating with said eccentrics, a plurality of saw blades mounted in the gang saw frame, means for rotating said shafts to reciprocate the gang saw frame in a circular path, and means for moving the gang saw assembly downward upon the main frame.

4. A gang saw apparatus for cutting stone, comprising a main frame having corner posts and horizontal frame members connected to the upper ends of said posts, a gang saw assembly comprising sleeves slidable upon each of said posts, side frame members connected to said sleeves, transverse shafts journalled upon said side frame members, eccentrics mounted upon said shafts, a gang saw frame, eccentric bearings upon the gang saw frame cooperating with said eccentrics, a plurality of saw blades mounted in the gang saw frame, means for rotating said shafts to reciprocate the gang saw frame in a circular path, said means comprising spaced motors mounted upon each of said side frame members, means operatively connecting said motors to said shafts, pitman wheels upon said shafts, a pitman rod connected to said pitman wheels, and feed screws operatively associated with each of said sleeves for moving the gang saw assembly downward upon the main frame.

5. A gang saw apparatus for cutting stone, comprising a main frame having corner posts and horizontal frame members connected to the upper ends of said posts, a gang saw assembly comprising sleeves slidable upon each of said posts, side frame members connected to said sleeves, transverse shafts journalled upon said side frame members, eccentrics mounted upon said shafts, a gang saw frame, eccentric bearings upon the gang saw frame cooperating with said eccentrics, a plurality of saw blades mounted in the gang saw frame, means for rotating said shafts to reciprocate the gang saw frame in a circular path, vertical feed screws journalled in the main frame, nuts upon each of said sleeves and threaded upon said feed screws, and means for rotating said feed screws in unison for positively moving the gang saw assembly downward upon the main frame.

6. A gang saw apparatus for cutting stone, comprising a main frame having corner posts and horizontal frame members connected to the upper ends of said posts, a gang saw assembly comprising sleeves slidable upon said posts, side frame members connected to said sleeves, transverse shafts journalled upon said side frame members, eccentrics mounted upon said shafts, a gang saw frame, eccentric bearings upon the gang saw frame cooperating with said eccentrics, a plurality of saw blades mounted in the gang saw frame, means for rotating said shafts to reciprocate the gang saw frame in a circular path, vertical feed screws journalled in the main frame, nuts upon said sleeves and threaded upon said feed screws, means for rotating said feed screws in unison for moving the gang saw assembly downward upon the main frame, and an alternate means for rapidly rotating said feed screws in the reverse direction for rapidly moving the gang saw assembly upward upon the main frame.

7. A gang saw apparatus for cutting stone, comprising a main frame having corner posts and horizontal frame members connected to the upper ends of said posts, a gang saw assembly comprising sleeves slidable upon said posts, said frame members connected to said sleeves, transverse shafts journalled upon said side frame members, eccentrics mounted upon said shafts, a gang saw frame, eccentric bearings upon the gang saw frame cooperating with said eccentrics, a plurality of saw blades mounted in the gang saw frame, means for rotating said shafts to reciprocate the gang saw frame in a circular path, means for slowly moving the gang saw assembly downward upon the main frame and an alternate means for moving the gang saw assembly rapidly upward upon the main frame.

8. A gang saw apparatus for cutting stone, comprising a main frame, means for positioning said main frame over a block of stone, a gang saw frame mounted for vertical movement upon the main frame, a plurality of saw blades mounted in the gang saw frame, means for reciprocating the gang saw frame in a circular path, means for moving the gang saw frame slowly downward upon the main frame and an alternate means for moving the gang saw frame rapidly upward upon the main frame.

9. A gang saw apparatus for cutting stone, comprising a rectangular main frame having four corner posts and horizontal frame members connected to the upper ends of said posts, a gang saw assembly comprising sleeves slidable upon each of said posts, side frame members connected to said sleeves, transverse shafts journalled upon said side frame members, eccentrics mounted upon said shafts, a gang saw frame, eccentric bearings upon the gang saw frame cooperating with said eccentrics, a plurality of saw blades mounted in the gang saw frame, means for rotating said shafts to reciprocate the gang saw frame in a circular path, vertical feed screws journalled in the four corners of the main frame, nuts upon each of said sleeves and threaded upon said feed screws, a drive shaft, gearing operatively connecting said drive shaft to said feed screws, a motor, and means for operatively connecting said motor to the drive shaft.

10. A gang saw apparatus for cutting stone, comprising a main frame having corner posts and horizontal frame members connected to the upper ends of said posts, a gang saw assembly comprising sleeves slidable upon said posts, side frame members connected to said sleeves, transverse shafts journalled upon said side frame members, eccentrics mounted upon said shafts, a gang saw frame, eccentric bearings upon the gang saw frame cooperating with said eccentrics, a plurality of saw blades mounted in the gang saw frame, means for rotating said shafts to reciprocate the gang saw frame in a circular path, vertical feed screws journalled in the main frame, nuts upon said sleeves and threaded upon said feed screws, a drive shaft, gearing operatively connecting said drive shaft to said feed screws, a motor, a second motor, a gear reduction operatively connected to the second motor, and means for selectively connecting said first named motor or said gear reduction to the drive shaft.

11. A gang saw apparatus for cutting stone, comprising a main frame having corner posts and horizontal frame members connected to the upper ends of said posts, a gang saw assembly comprising sleeves slidable upon said posts, side frame members connected to said sleeves, transverse shafts journalled upon said side frame members, eccentrics mounted upon said shafts, a gang saw frame, eccentric bearings upon the gang saw frame cooperating with said eccentrics, a plurality of saw blades mounted in the gang saw frame, means for rotating said shafts to reciprocate the gang saw frame in a circular path, vertical feed screws journalled in the main frame, nuts upon said sleeves and threaded upon said feed screws, means for rotating said feed screws in unison for moving the gang saw assembly vertically in one direction upon the main frame during the cutting operation, and an alternate means for rapidly rotating said feed screws in the reverse direction for rapidly moving the gang saw assembly in the opposite direction.

12. A gang saw apparatus for cutting stone, comprising a main frame having corner posts and horizontal frame members connected to the upper ends of said posts, a gang saw assembly comprising sleeves slidable upon said posts, said frame members connected to said sleeves, transverse shafts journalled upon said side frame members, eccentrics mounted upon said shafts, a gang saw frame, eccentric bearings upon the gang saw frame cooperating with said eccentrics, a plurality of saw blades mounted in the gang saw frame, means for rotating said shafts to reciprocate the gang saw frame in a circular path, means for slowly moving the gang saw assembly vertically in one direction upon the main frame during the cutting operation, and an alternate means for moving the gang saw assembly rapidly in the opposite direction.

13. A gang saw apparatus for cutting stone, comprising a main frame having tubular corner posts and horizontal frame members connected to the upper ends of the posts, a gang saw assembly comprising sleeves slidable upon the corner posts, side frame members connected to said sleeves, a gang saw frame mounted for reciprocation upon said side frame members, a plurality of saw blades mounted in the gang saw frame, sheaves mounted upon the tops of said posts, cables connected to said sleeves, counter-weights upon said cables located within the tubular posts, means for reciprocating the gang saw frame in a circular path, means for moving the gang saw assembly downward upon the main frame and means for rapidly moving the gang saw assembly upward from the main frame.

References Cited in the file of this patent

UNITED STATES PATENTS

| | | |
|---|---|---|
| 337,661 | Campbell | Mar. 9, 1886 |
| 364,458 | Young | June 7, 1887 |
| 364,459 | Young | June 7, 1887 |
| 894,046 | Pierce | July 21, 1908 |
| 1,347,365 | Fletcher | July 20, 1920 |
| 2,411,585 | Minkler | Nov. 26, 1946 |

FOREIGN PATENTS

| | | |
|---|---|---|
| 275,722 | Switzerland | June 15, 1951 |
| 381,229 | Great Britain | Oct. 3, 1932 |
| 619,461 | Great Britain | Mar. 9, 1949 |
| 730,713 | France | Aug. 20, 1932 |